United States Patent Office 2,715,519
Patented Aug. 16, 1955

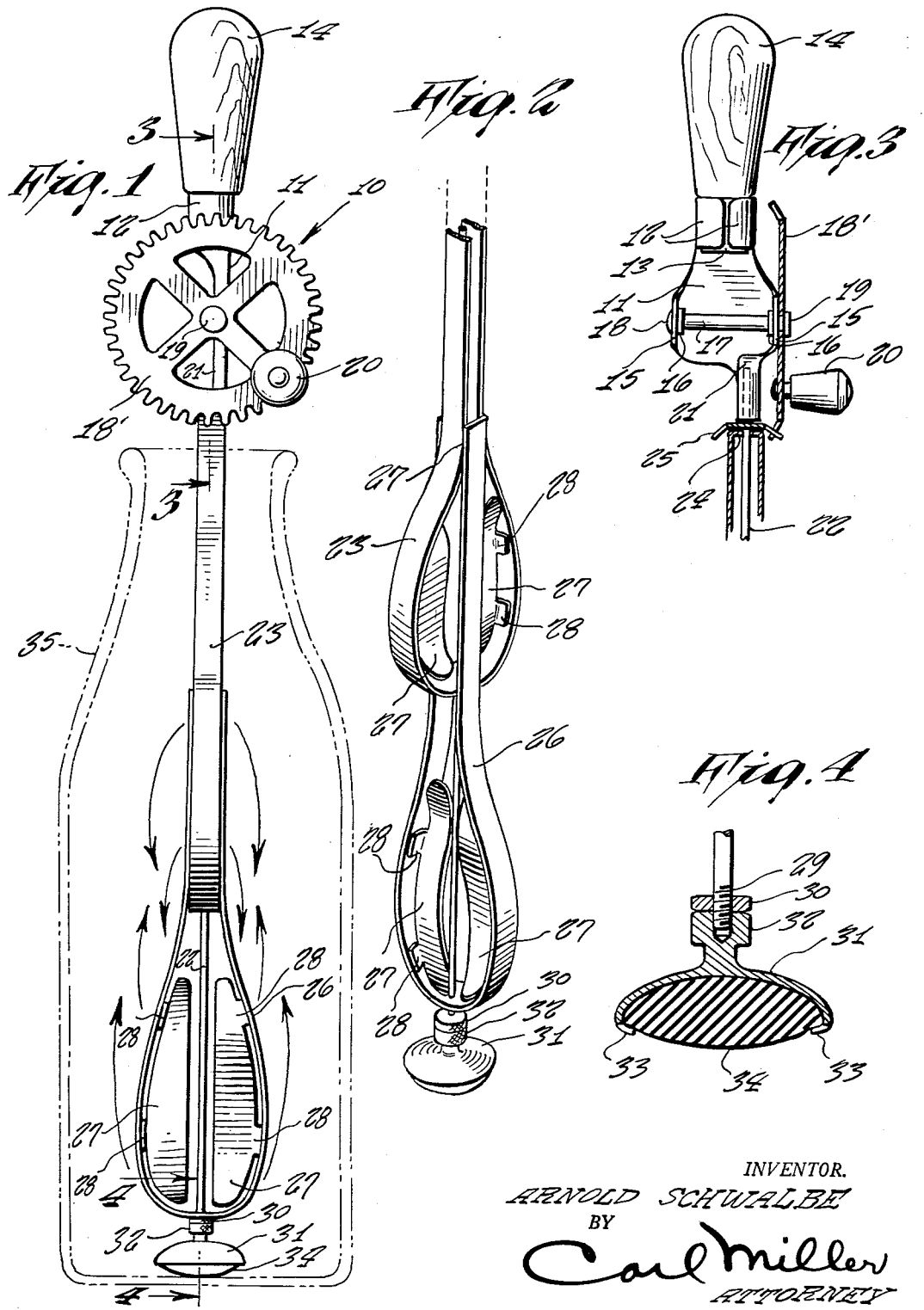

2,715,519

WHIPPING DEVICE

Arnold Schwalbe, Brooklyn, N. Y.

Application December 19, 1952, Serial No. 326,930

2 Claims. (Cl. 259—135)

This invention relates to whipping devices.

It is an object of the present invention to provide a whipping device adapted to mix or whip materials in bottles, jars or glasses with restricted openings at the tops thereof as small as about one inch.

It is another object of the present invention to provide a device of the above type which can be used alternately for mixing chocolate milk, fruit juices, mayonnaise and similar materials.

It is still another object of the present invention to provide a device of the above type which includes upper and lower whipping rotors, the lower rotor being used for whipping in a shallow glass or container, and both upper and lower rotors being used for whipping in tall glasses or containers as for example when making malted milks or the like.

It is still another object of the present invention to provide a device of the above type wherein the operating mechanism is removable from the rotors and replaceable by a small motor to provide a more efficient and faster malted milk shaker and mixer for soda fountains.

It is still another object of the present invention to provide a device of the above type which may be used inside milk bottles to mix the measured ingredients of baby formulae, insuring a better distribution of the ingredients than has heretofore been achieved.

It is still another object of the present invention to provide a whipping device of the above type which is more efficient and consumes less time than the old fashioned shaker method employed with the above mentioned ingredients.

It is still another object of the present invention to provide a device of the above type wherein the upper and lower rotors are provided with vanes, the upper rotor vanes imparting a downward action to the mixture being whipped or mixed while the lower rotor vanes impart an upward action to the mixture, thus insuring a thorough mixing from top to bottom of the mixture.

Other objects of the present invention are to provide a whipping device bearing the above objects in mind which is of simple construction, inexpensive to manufacture, has a minimum number of parts, is compact, durable, easy to operate and efficient in use.

For other objects and for a better understanding of the invention reference may be had to the following detailed description taken in connection with the accompanying drawing, in which:

Fig. 1 is a front elevational view of a whipping device embodying the features of the present invention and showing the same in operative use within a narrow neck bottle;

Fig. 2 is a fragmentary perspective view of the device showing the rotors;

Fig. 3 is a vertical sectional view taken along line 3—3 of Fig. 1 and

Fig. 4 is a vertical sectional view taken along line 4—4 of Fig. 1.

Referring more in detail to the drawing, in which similar reference characters identify corresponding parts throughout the several views, there is shown a whipping device, referred to collectively as 10, and including a sheet metal frame 11 provided at its top with integrally formed ears 12 which are bent around the cylindrical extension 13 of a wooden handle 14, substantially as illustrated.

The vertical sides of the frame 11 are integrally formed with ears 15 bent at substantially ninety degrees to the frame 11, the inner faces of the ears 15 being formed with inwardly extending hubs 16 which rotatably mount a transverse shaft 17. One end of shaft 17 is peened as at 18, while the other end fixedly carries a drive gear 18' and is peened as at 19, the gear 18' rotatably mounting a crank handle 20, substantially as illustrated in Figs. 1 and 3.

The lower end of frame 11 adjacent the gear 18' is integrally formed with a downwardly extending portion 21 which is bent around an elongated shaft 22, the portion 21 being fixedly secured to the upper end of shaft 22 by suitable means, as for example welding.

A rotor consisting of a strap of sheet metal 23 is bent as shown in Figs. 1 and 2, the upper ends thereof extending parallel to each other and being inwardly bent, as at 24, where they are suitably secured to a driven bevel gear 25, as shown in Fig. 3, the gear 25, the portion 24 and the bottom of the rotor all being provided with aligned openings which rotatably receive the shaft 22.

A second lower rotor consisting of a sheet metal strap 26 is similarly bent, with the upper ends thereof being welded to the intermediate portion of strap 23, as shown in Fig. 2, as at 27, the bottom of strap 26 being provided with an opening rotatably receiving the bottom of shaft 22. It will be noted that the straps 23 and 26 are disposed at substantially right angles to each other.

The space intermediate the straps 23 and 26 and shaft 22 is occupied by four vanes, each vane consisting of a sheet metal strip 27 provided at its outer side with inwardly bent, integrally formed ears 28, substantially as illustrated in Figs. 1 and 2, the ears 28 being welded to the inner sides of straps 23 and 26. The strips 27 are bent vertically in substantially S-shaped manner with the ends thereof extending outwardly from the shaft 22 for a purpose to be hereinafter referred to.

As shown in Fig. 4, the lower end of shaft 22 is threaded, as at 29, and releasably receives a lock nut 30 and a hollow stand 31, the upper end of the latter being enlarged as at 32 and adapted to abut the lock nut 30, substantially as illustrated. The peripheries of lock nut 30 and enlargement 32 are knurled to facilitate their removal from threaded end 29 as will become clear in a manner to be hereinafter described.

The lower edge of stand 31 is integrally formed with an inwardly bent flange 33 securing an ellipsoidal block 34 of suitable non-slipping material, for example rubber, within the stand 31, as shown in Fig. 4.

In operation, the device 10 is placed within a narrow neck bottle, indicated in dotted outline in Fig. 1, with the material 34 resting on the bottom thereof and the handle 14 firmly grasped in one hand. The crank handle 20 is then turned with the other hand to rotate gear 18' which in turn drives bevel gear 25 to impart angular motion to the upper and lower rotors 23 and 26 as will be obvious.

The revolving rotors 23 and 26 churn the material within the bottle, with the vanes 27 of the upper rotor, due to their S-shaped contour, driving the material downward to the center of the bottle, as shown by the arrows in Fig. 1, while the vanes 27 of the lower rotor, due to their S-shaped contour, driving the material upward to the center of the bottle, also as shown by the arrows in Fig. 1, thus bringing the mixture to a thorough admixing from top to bottom of the bottle.

It will be noted that the revolving rotors 23 and 26 are supported on shaft 22 by the lock nut 30, which also serves to frictionally prevent unscrewing of the enlargement 32 of the stand 31.

The non-slipping material 34 frictionally engages the bottom of the bottle 35 and prevents movement of the device from the longitudinal axis of the bottle during operation.

The device may be similarly inserted and operated in a hollow bottle or container, in which case the lower rotor 26 effects the mixing with the upper rotor 23 moving freely above the level of the mixture.

Removal and replacement, when worn out, of the rotors 23 and 26, along with their associated vanes 27, is effected by merely removing the stand 31 and lock nut 30, the rotors 23 and 26, their associated vanes 27 and the bevel gears 25 sliding downwardly and off the shaft 22 as a unit. This separation of the rotors and the operating mechanism can also be effected for the purpose of mounting the former on the drive shaft of a small motor when it is desired to provide a more efficient and faster malted milk whip for soda fountains or the like.

While various changes may be made in the detailed construction, it shall be understood that such changes shall be within the spirit and scope of the invention as defined by the appended claims.

Having thus set forth and disclosed the nature of my invention, what is claimed is:

1. A whipping device comprising a frame, a stationary handle fixedly carried by the top of said frame, a drive gear rotatably mounted transversely on said frame, a crank handle carried by said drive gear, a downwardly extending portion integrally formed in the bottom of said frame adjacent said gear, an elongated shaft, said downwardly extending portion being bent around the upper end of said shaft and secured thereto, a first rotor, said first rotor comprising a strap of metal bent into a substantially bowling pin shape, the upper ends of said strap extending substantially parallel to each other and being inwardly bent, a driven bevel gear fixedly secured to said inwardly bent ends and in mesh with said drive gear, said inwardly bent ends and the opposite end of said strap from said inwardly bent ends having aligned openings receiving said shaft, the lower end of said shaft extending downwardly below the bottom of said first rotor, at least one more rotor, said second rotor comprising a strap of metal bent into a substantially bowling pin shape, the upper ends of said strap extending substantially parallel to each other and being secured to the intermediate portion of said first rotor, the plane of said second rotor being disposed at substantially right angles to the plane of said first rotor, said second rotor at the bottom thereof having an opening receiving the bottom of said shaft, said shaft extending below the bottom of said second rotor and being externally threaded, a pair of vanes fixedly carried by each of said rotors on each side of said shaft, each of said vanes being vertically disposed and of a substantially S-shaped contour, the ends of said vanes extending outwardly from said shaft, a lock nut secured to the threaded end of said shaft and adapted to support the lowermost of said rotors, a hollow stand having a threaded opening receiving the bottom end of said threaded shaft below said nut, and a substantially ellipsoidal block of material of non-slipping characteristics within said hollow stand and extending downwardly from the bottom thereof whereby to frictionally engage the bottom of a container.

2. A whipping device according to claim 1, said hollow stand portion having said threaded opening being enlarged and adapted to abut the adjacent base of said lock nut in frictional engagement therewith, said hollow stand along the open bottom thereof being provided with an inwardly extending flange adapted to secure said ellipsoidal block therewithin.

References Cited in the file of this patent
UNITED STATES PATENTS

| Number | Name | Date |
|---|---|---|
| 785,249 | Burnham | Mar. 21, 1905 |
| 845,341 | Dunlap | Feb. 26, 1907 |
| 846,662 | Godward | Mar. 12, 1907 |
| 1,744,445 | Casey | Jan. 21, 1930 |
| 1,825,450 | Halse | Sept. 29, 1931 |
| 1,925,638 | Killman | Sept. 5, 1933 |
| 2,577,896 | Kinton | Dec. 11, 1951 |